(12) United States Patent
Iwai et al.

(10) Patent No.: US 8,366,213 B2
(45) Date of Patent: Feb. 5, 2013

(54) ASSEMBLY STRUCTURE OF A CABINET AND THIN DISPLAY DEVICE

(75) Inventors: Takeo Iwai, Osaka (JP); Katsuhiko Makino, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 467 days.

(21) Appl. No.: 12/155,080

(22) Filed: May 29, 2008

(65) Prior Publication Data

US 2008/0297013 A1 Dec. 4, 2008

(30) Foreign Application Priority Data

May 30, 2007 (JP) ................................. 2007-143410

(51) Int. Cl.
*A47B 81/06* (2006.01)

(52) U.S. Cl. ............................. 312/7.2; 348/836; 349/58

(58) Field of Classification Search ................... 312/7.2, 312/265.5, 265.6; 348/836, 839, 843; 349/58, 349/60

See application file for complete search history.

(56) References Cited

U.S. PATENT DOCUMENTS

| | | | | |
|---|---|---|---|---|
| 4,017,129 A * | 4/1977 | Boldt et al. | ..................... | 312/7.2 |
| 5,363,150 A * | 11/1994 | Kojima | ......................... | 348/836 |
| 5,419,626 A * | 5/1995 | Crockett | ........................ | 312/7.2 |
| 5,568,357 A * | 10/1996 | Kochis et al. | ............ | 361/679.26 |
| 5,570,267 A * | 10/1996 | Ma | ........................... | 361/679.21 |
| 5,613,237 A * | 3/1997 | Bent et al. | ..................... | 455/351 |
| 5,699,132 A * | 12/1997 | Adachi et al. | ................. | 348/836 |
| 5,995,170 A * | 11/1999 | Ohira et al. | .................... | 348/836 |
| 6,310,767 B1 * | 10/2001 | Spear et al. | .............. | 361/679.24 |
| 6,493,045 B1 * | 12/2002 | Heirich | ......................... | 348/836 |
| 6,559,907 B1 * | 5/2003 | Byoun | ......................... | 349/58 |
| 6,575,541 B1 * | 6/2003 | Hedrick et al. | ............ | 312/223.1 |
| 6,661,474 B2 * | 12/2003 | Hung | ............................ | 348/836 |
| 6,812,976 B2 * | 11/2004 | Satonaka | ........................ | 349/58 |
| 6,919,678 B2 * | 7/2005 | Ozolins et al. | ............... | 313/479 |
| 7,466,540 B2 * | 12/2008 | Takahashi et al. | ........ | 361/679.27 |
| 7,477,328 B2 * | 1/2009 | Maruta | ......................... | 348/797 |
| 7,529,082 B2 * | 5/2009 | Maruta | ......................... | 312/7.2 |
| 7,812,891 B2 * | 10/2010 | Maruta | ......................... | 348/794 |
| 2002/0015118 A1 * | 2/2002 | Kashimoto | ..................... | 349/58 |
| 2002/0080297 A1 * | 6/2002 | Sung | ............................. | 349/58 |
| 2003/0112379 A1 * | 6/2003 | Jung | ............................ | 348/789 |
| 2004/0090560 A1 * | 5/2004 | Jang | ............................ | 348/836 |

(Continued)

FOREIGN PATENT DOCUMENTS

EP 1 777 054 A1 4/2007
JP 9-297542 A1 11/1997

(Continued)

*Primary Examiner* — James O Hansen
*Assistant Examiner* — Sasha T Varghese
(74) *Attorney, Agent, or Firm* — Morgan, Lewis & Bockius LLP

(57) ABSTRACT

A projection is formed on the upper edge of the side wall of a front cabinet, a depression is formed on the upper edge of the side wall of a front cover, and a protrusion is formed on the upper edge of the side wall of a rear cabinet. The front cabinet is supported between the front cover and the rear cabinet, such that the projection of the front cabinet is pressed against the depression of the front cover by the protrusion of the rear cabinet and the upper edge of the side wall thereof, and the projection of the front cabinet is locked by the depression of the front cover.

3 Claims, 7 Drawing Sheets

U.S. PATENT DOCUMENTS

| | | |
|---|---|---|
| 2005/0024552 A1 | 2/2005 | Tsuo et al. ............... 349/58 |
| 2005/0179832 A1* | 8/2005 | Kim et al. ............... 349/58 |
| 2005/0286214 A1 | 12/2005 | Chen ....................... 361/681 |
| 2006/0077629 A1 | 4/2006 | Shiraishi ................. 361/681 |
| 2006/0098126 A1* | 5/2006 | Song ........................ 348/836 |
| 2007/0002206 A1* | 1/2007 | Shirai ..................... 349/58 |
| 2007/0097330 A1* | 5/2007 | Park ........................ 353/79 |
| 2008/0158445 A1* | 7/2008 | Yokawa ................... 348/836 |
| 2011/0317087 A1* | 12/2011 | Ling et al. ............... 349/58 |

FOREIGN PATENT DOCUMENTS

| | | |
|---|---|---|
| JP | 11-052883 | 2/1999 |
| JP | 11-126034 | 5/1999 |
| JP | 2000-324425 | 11/2000 |
| JP | 2001-036262 A1 | 2/2001 |
| WO | WO 03/005402 A1 | 1/2003 |

\* cited by examiner

ASSEMBLY STRUCTURE OF A CABINET AND THIN DISPLAY DEVICE

This application is based on Japanese Patent Application No. 2007-143410 filed on May 30, 2007, the contents of which are hereby incorporated by reference.

BACKGROUND OF THE INVENTION

1. Field of the Invention

The present invention relates to assembly structures of a cabinet, and thin display devices using the cabinet.

2. Description of Related Art

In recent years, thin display devices, typified by liquid crystal display devices, have become commercially practical. In general, such a thin display device includes a cabinet composed of a front cabinet and a rear cabinet, and a display device body for displaying images is placed inside the cabinet. For example, in the liquid crystal display device, the display device body is composed of a liquid crystal display panel, a drive circuit for driving the liquid crystal display panel, a tuner for receiving a broadcast signal, a circuit substrate on which, for example, a control circuit for controlling different parts is mounted, and the like.

Some thin display devices adopt a double-layered structure in which the front face of the front cabinet is covered with a front cover. This double-layered structure allows not only the front face of the thin display device to be protected by the front cover, but also the appearance of the thin display device, and hence the overall design of the device, to be improved by using a front cover having a surface to which gloss-coating or matte finish is applied.

FIG. 7 is an exploded perspective view showing a conventional double-layered structure of a front cover 2 and a front cabinet 3. In general, the front cover 2 has, in the center thereof, a display window 2c for displaying images from the display device body, and is almost identical in shape to the front cabinet 3. The front cover 2 has, on the back face thereof, a plurality of hooked lugs 2b for joining the front cover 2 and the front cabinet 3 together, the front cover 2 and the lugs 2b being integrally formed of resin.

On the other hand, the front cabinet 3 has, on the front face thereof, holes 3b for receiving the lugs 2b of the front cover 2, the holes 3b being integrally formed of resin so as to penetrate through the side walls of the front cabinet 3. The front cabinet 3 is put into the front cover 2 with the lugs 2b protruding inward from the side walls of the front cover 2 fit into the corresponding holes 3b formed in the side walls of the front cabinet 3, such that the front cabinet 3 and the front cover 2 are securely fixed together. Then, the rear cabinet is fixed to the back of the front cabinet 3 with screws. In this way, the cabinet body is completed.

However, in the course of assembly of the cabinet, once the front cover 2 and the front cabinet 3 are tightly joined together with the hooked lugs 2b fitting into the holes 3b, the hooked lugs 2b cannot be easily released from the holes 3b due to the tight fit therebetween achieved by the hook portions of the hooked lugs 2b. This makes it difficult to detach the front cover 2 from the front cabinet 3. On the other hand, if, instead of the above-described assembly structure using the lugs 2b and the holes 3b, a structure in which the front cabinet 3 and the front cover 2 are joined together with screws is adopted, it is necessary to increase the number of screws to join them together with sufficient joint strength. This necessitates extra screws, and thus increases costs of parts. In addition, this structure increases time and labor for work with screws, reducing the efficiency of assembly.

Disclosed as a conventional assembly structure of a cabinet are a structure disclosed in JP-A-H11-52883, in which a front cabinet and a rear cabinet are fixed together with a lug fitting into a tongue flap, a structure disclosed in JP-A-H11-126034, in which a front cabinet and a rear cabinet are fixed together with screws, and a structure disclosed in JP-A-2000-324425, in which a front cabinet and a main cabinet are fixed together with an engaging lug engaged in an engaging hole. All of which are directed to a structure proposed for securely fixing the front cabinet and the rear cabinet together. Therefore, no consideration is given to the possibility that the front cabinet and the rear cabinet thus fixed together are disassembled into separate parts.

SUMMARY OF THE INVENTION

In view of the problems described above, an object of the present invention is to provide an assembly structure of a cabinet, the structure that ensures sufficient joint strength between a front cover and a front cabinet while allowing the front cover to be detached from the front cabinet with ease, and that can reduce the number of parts of the cabinet as a whole and thus costs of parts, and to provide a thin display device using such a cabinet.

To achieve the above object, according to one aspect of the present invention, in an assembly structure of a cabinet provided with a front cover having a side wall, a front cabinet having a side wall, and a rear cabinet having a side wall, a projection protruding outward from the front cabinet is formed on an upper edge of the side wall of the front cabinet, a depression is formed on an upper edge of the side wall of the front cover, a protrusion protruding in a direction in which the side wall of the rear cabinet erects is formed on an upper edge of the side wall thereof. The front cabinet is supported between the front cover and the rear cabinet, such that the projection is pressed against the depression by the protrusion and the upper edge of the side wall of the rear cabinet, and the projection is locked by the depression.

Preferably, in the assembly structure described above, the projection has a wedge shape.

According to another aspect of the present invention, a thin display device is provided with a cabinet having the assembly structure described above, the cabinet inside which a display device body is placed.

According to the first constitution of the present invention, when the front cabinet is put into the front cover having the side wall, the projection formed on the upper edge of the side wall of the front cabinet fits into the depression formed on the upper edge of the side wall of the front cover. Since the depression is formed on the upper edge of the side wall, and the projection is not locked by the depression in a direction opposite to a direction in which the front cabinet is attached. This makes it possible to easily detach the front cabinet from the front cover. In addition, it is possible to form the projection and the depression into simple shapes, allowing them to be formed with a die with a high degree of forming efficiency.

Furthermore, since the front cabinet is supported between the front cover and the rear cabinet, the rear cabinet is urged in a direction toward the front cover. As a result, the projection formed in the side wall of the front cabinet is pressed against the depression formed in the side wall of the front cover by the upper edge of the side wall of the rear cabinet and the protrusion protruding from the upper edge thereof in a direction in which the side wall erects. This allows the projection to be stably locked by the depression, ensuring constant joint strength between the front cabinet and the front cover.

When the rear cabinet is detached from the front cabinet, the projection is released from the pressing force received from the upper edge and the protrusion of the side wall of the rear cabinet, making it possible to easily detach the front cabinet from the front cover.

In addition, since the front cabinet is fixedly supported between the front cover and the rear cabinet, it is possible to eliminate the need for screws to fix the front cabinet and the front cover together and fix the front cabinet and the rear cabinet together.

According to the second constitution of the present invention, since the projection has a wedge shape, the projection fits into the depression more securely when pressed against it. This allows the projection to be locked by the depression more firmly. As a result, the front cover and the front cabinet are joined together more stably.

According to the third constitution of the present invention, the thin display device is provided with a cabinet having the structure described above, the cabinet inside which a display device body is placed. This makes it possible to provide the thin display device having the above-described advantages.

DETAILED DESCRIPTION OF PREFERRED EMBODIMENTS

Figure 7:
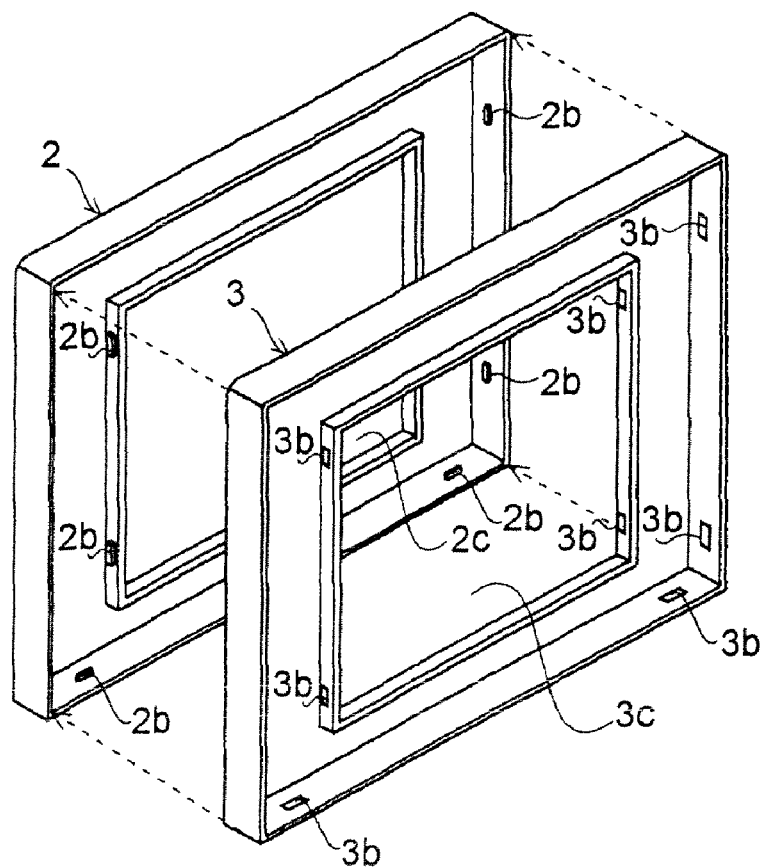
FIG. 7 is an exploded perspective view showing an example of a conventional assembly structure of a cabinet.

Hereinafter, preferred embodiments of the present invention will be described with reference to accompanying drawings. In the following description, such members as are found also in the conventional example shown in FIG. 7 will be identified with common reference characters, and their explanations will be omitted. In these drawings, the dimensional ratio of different structural components is made different from an actual dimensional ratio for easy understanding, and the structures of those components are not shown in detail but are only shown conceptually.

A liquid crystal display device according to an embodiment is composed of a cabinet built with a front cabinet and a rear cabinet and a liquid crystal display device body placed inside the cabinet. The liquid crystal display device body is composed of a liquid crystal display panel, a drive circuit for driving the liquid crystal display panel, a tuner for receiving a broadcast signal, and a circuit substrate on which, for example, a control circuit for controlling different parts is mounted.

Figure 1:
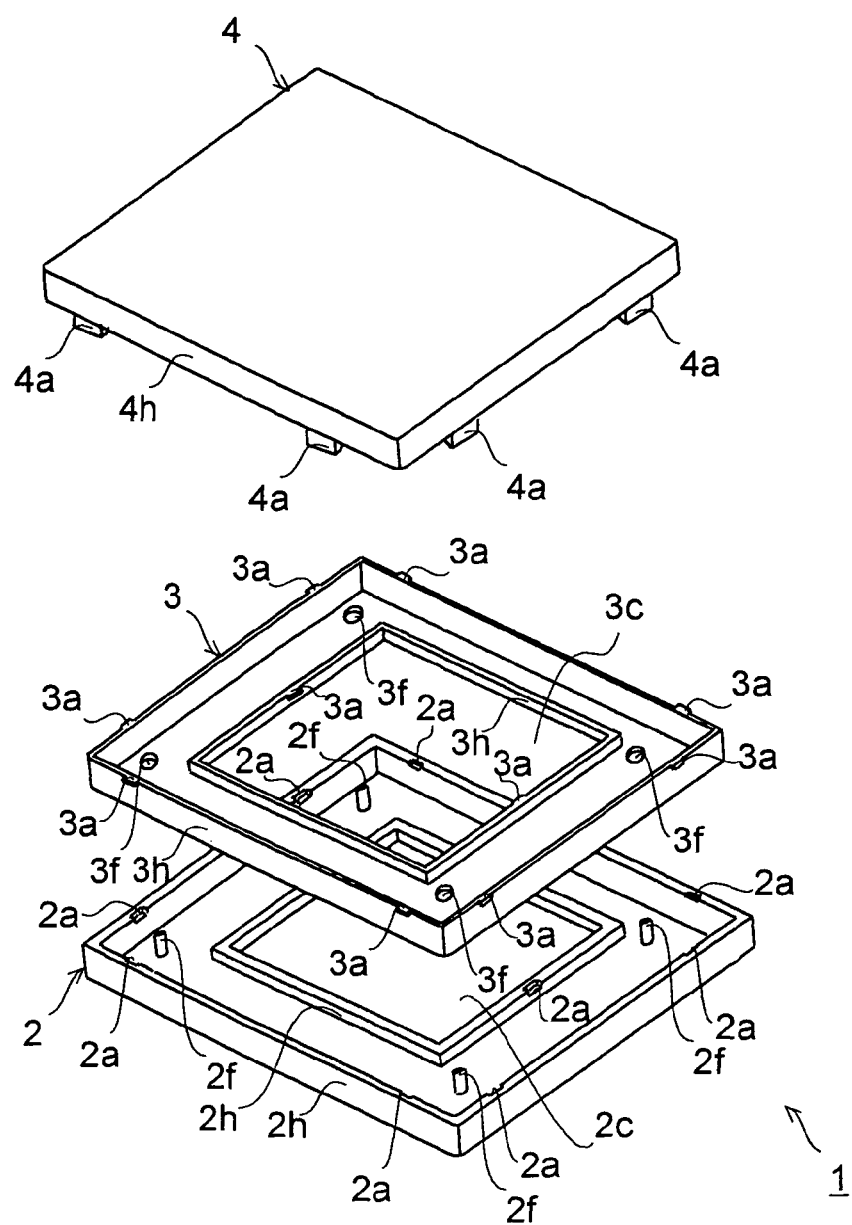
FIG. 1 is an exploded perspective view showing an embodiment of an assembly structure of a cabinet of the invention.
Figure 2:
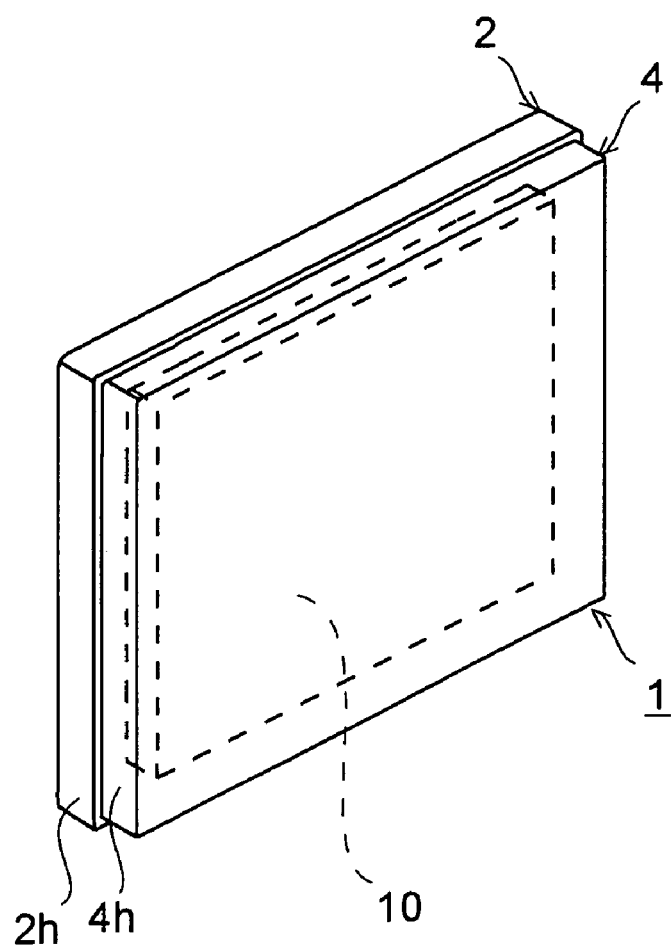
FIG. 2 is a perspective view showing the back face of the cabinet of the invention after assembly.

FIG. 1 is an exploded perspective view of a cabinet 1 inside which no liquid crystal display device body is placed. FIG. 2 is a perspective view showing the back face of the cabinet 1 after assembly. As shown in FIG. 1, the cabinet 1 is composed of a front cabinet 3 and a rear cabinet 4. On the front face of the front cabinet 3, a front cover 2 is attached. Here, the front cover 2, the front cabinet 3, and the rear cabinet 4 each have a storage portion surrounded with side walls. The front cabinet 3 is put into the front cover 2, such that the outer surfaces of the side walls 3h of the front cabinet 3 are brought into contact with the inner surfaces of the side walls 2h of the front cover 2. In addition, the front cabinet 3 and the rear cabinet 4 are assembled together, such that the upper edges of the side walls 3h and the side walls 4h make contact with each other. In this way, as shown in FIG. 2, the cabinet 1 having a space inside which the liquid crystal display device body 10 is placed is obtained. Here, the side walls 3h are covered with the side walls 2h of the front cover 2, and are not shown in FIG. 2.

The front cabinet 3 has, in the center thereof, a display window 3c for displaying images from the display device body. The display window is also surrounded with the side walls 3h. The side walls 3h have a plurality of projections 3a formed on the upper edges thereof, the projections 3a protruding outward from the front cabinet 3. The projections 3a will be described later in detail.

The front cover 2 is almost identical in shape to the front cabinet 3, and is slightly larger than the front cabinet 3. The front cabinet 3 can be put into the front cover 2 by fitting the front cabinet 3 into a space surrounded with the inner and outer side walls 2h of the front cover 2. The side walls 2h of the front cover 2 have depressions 2a formed on the upper edges thereof in positions corresponding to the positions where the projections 3a are formed. The depressions 2a are so shaped as to receive the projections 3a. As a result, when the front cabinet 3 is put into the front cover 2, the projections 3a make contact with the depressions 2a.

The front cover 2 has, on the back face thereof, rear cabinet connecting bosses 2f for providing connection with the rear cabinet 4. At the time of assembly of the cabinet, the rear cabinet connecting bosses 2f and front cover connecting bosses 4f (see FIG. 4) formed in the front face of the rear cabinet 4 are joined together with screws, such that the front cabinet 3 is supported between the front cover 2 and the rear cabinet 4.

Figure 3:
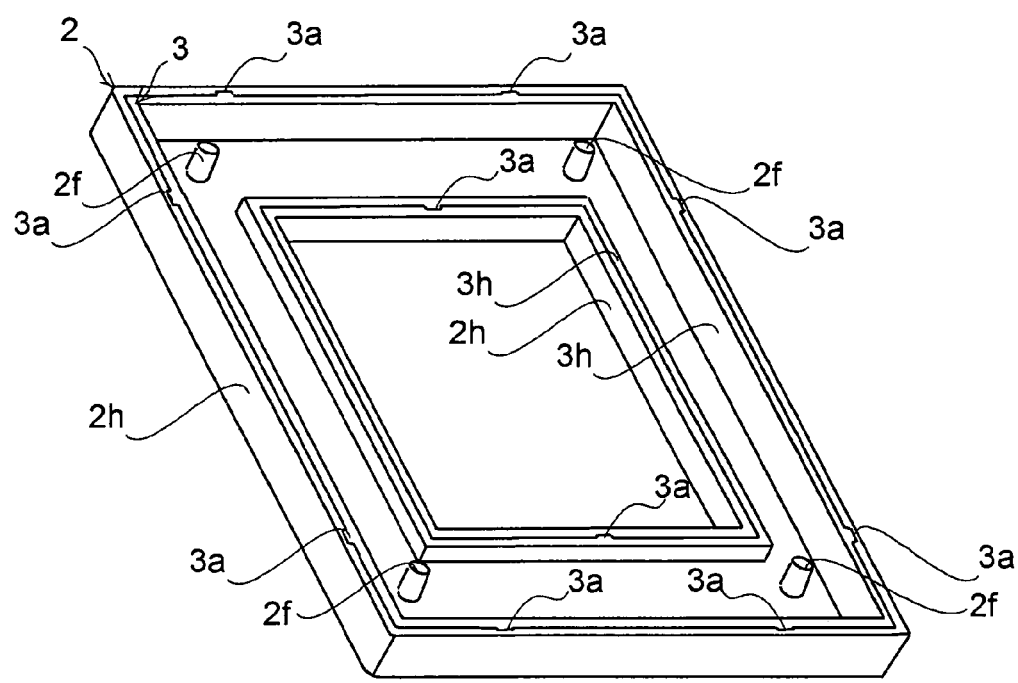
FIG. 3 is a perspective view showing the back face of the front cabinet of the invention, the front cabinet to which the front cover is attached.

FIG. 3 is a perspective view showing a state in which the front cabinet 3 is put into the front cover 2. As shown in this figure, the front cabinet 3 fits into the front cover 2, such that the outer surfaces of the side walls 3h of the front cabinet 3 are brought into contact with the inner surfaces of the side walls 2h of the front cover 2, and the projections 3a of the front cabinet 3 come into contact with the depressions 2a from above, the depressions 2a being formed on the upper edges of the side walls 2h of the front cover 2. At this point, the projections 3a are not locked by the depressions 2a in the upward direction, making it possible to easily detach the front cabinet 3 from the front cover 2.

Figure 4:
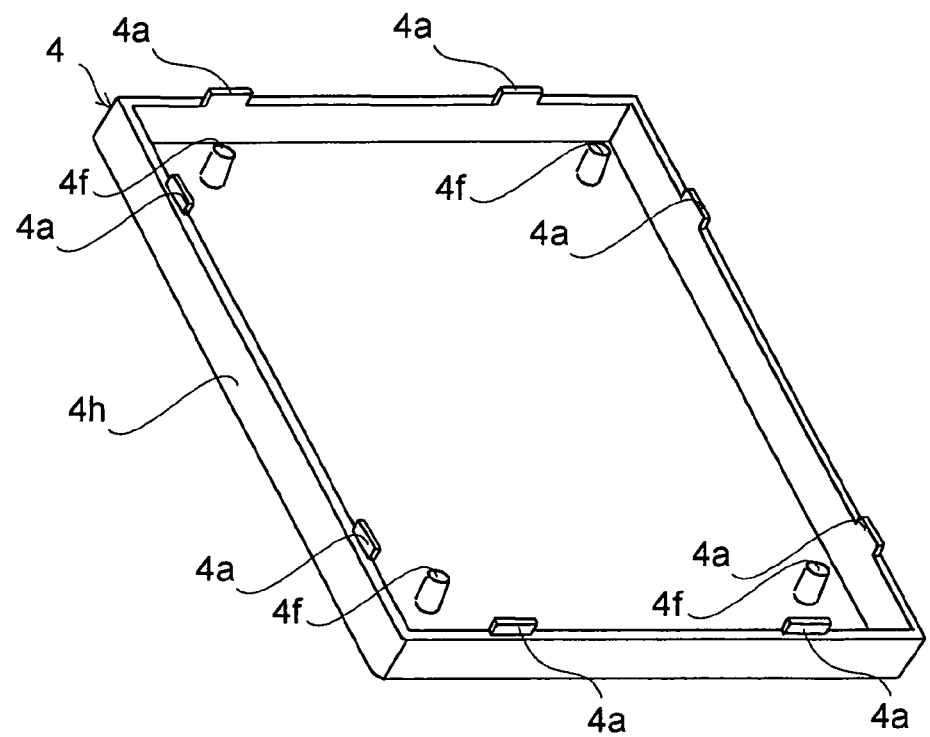
FIG. 4 is a perspective view showing the front face of the rear cabinet of the invention.

FIG. 4 is a perspective view showing the front face of the rear cabinet 4. As shown in this figure, the side walls 4h of the rear cabinet 4 have protrusions 4a formed on the upper edges thereof, the protrusions 4a protruding in a direction in which the side walls erect. Here, the protrusions 4a are formed so as to be thinner than the side walls 4h of the rear cabinet 4, and are located in positions corresponding to the positions where the projections 3a are formed. As a result, when the rear cabinet 4 and the front cabinet 3 are assembled together, the protrusions 4a are brought into contact with the inner surfaces of portions of the side walls 3h where the projections 3a are formed, and the upper edges of the side walls 4h, except for the protrusions 4a, are brought into contact with the upper edges of the side walls 3h. In addition, the rear cabinet 4 has, on the front face thereof, the front cover connecting bosses 4f provided one for each of the rear cabinet connecting bosses 2f formed on the back face of the front cover 2. This makes it possible to fixedly support the front cabinet 3 between the front cover 2 and the rear cabinet 4 by joining the rear cabinet connecting bosses 2f and the front cover connecting bosses 4f together with screws.

Figure 5:
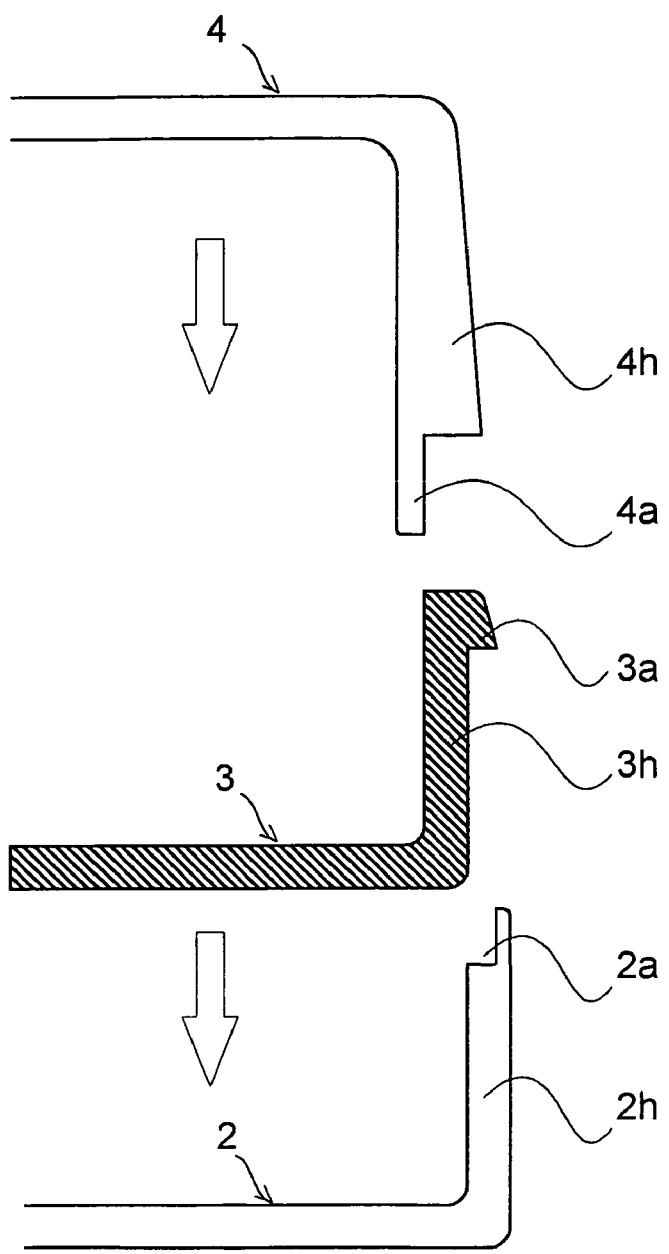
FIG. 5 is a sectional view showing a joint of the cabinet of the invention before assembly.

FIG. 5 is a sectional view of the projection 3a, the depression 2a, the protrusion 4a, and the side walls, showing a state in which the front cover 2, the front cabinet 3, and the rear cabinet 4 are yet to be assembled together. As shown in this figure, the projection 3a has a wedge shape, and the depression 2a is so shaped as to receive the wedge-shaped projection 3a. When the front cover 2 and the front cabinet 3 are assembled together, the outer surface of the side wall 3h of the front cabinet 3 is brought into contact with the inner surface of the side wall 2h of the front cover 2, and, when the outer bottom surface of the front cover 2 is brought into contact with the inner bottom surface of the front cabinet 3, the projection 3a makes contact with the depression 2a. At this point, although the projection 3a is caught in the depression 2a due to the shape of the projection 3a, the projection 3a is not locked by the depression 2a in the upward direction, making it possible to easily detach the front cabinet 3 from the front cover 2.

Figure 6:
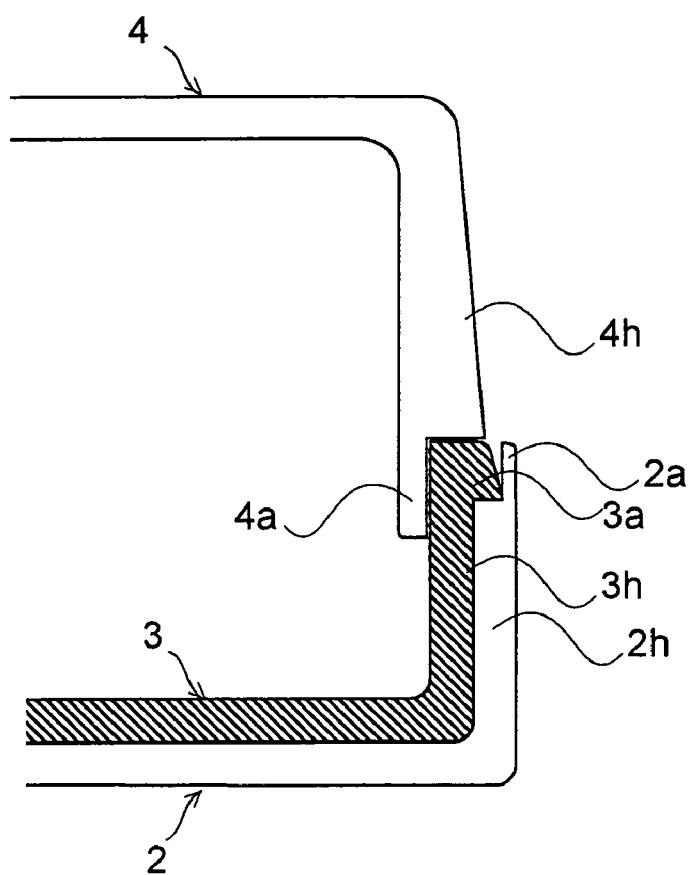
FIG. 6 is a sectional view showing a joint of the cabinet of the invention after assembly.

FIG. 6 is a sectional view of the projection 3a, the depression 2a, the protrusion 4a, and the side walls, showing a state in which the front cover 2, the front cabinet 3, and the rear cabinet 4 are assembled together. As shown in this figure, the upper edge of the side wall 3h of the front cabinet 3 makes contact with the upper edge of the side wall 4h of the rear cabinet 4, and the protrusion 4a formed in the side wall 4h of the rear cabinet 4 makes contact with the inner surface of the side wall 3h.

If the front cover 2 and the rear cabinet 4 in this state are fixed together with screws, the side wall 3h of the front cabinet 3 is supported between the inner bottom surface of the front cover 2 and the side wall 4h of the rear cabinet 4, and the projection 3a is pressed against the depression 2a by the upper edge of the side wall 4h and the protrusion 4a in a portion where the projection 3a and the depression 2a make contact with each other. As a result, part of the projection 3a securely fits into the depression 2a, whereby the projection 3a is locked by the depression 2a. This ensures stable joint strength between the front cabinet 2 and the front cover 4. In addition, the protrusion 4a making contact with the inner surface of the side wall 3h supports the side wall 3h, and thereby prevents the projection 3a from moving in the lateral direction.

On the other hand, if the screws fixing the front cover 2 and the rear cabinet 4 together are removed, the projection 3a is released from the pressing force received from the upper edge and the protrusion 4a of the side wall 4h of the rear cabinet 4, and the projection 3a is released from the depression 2a. This makes it possible to easily detach the front cabinet 3 from the front cover 2.

Furthermore, as a result of the front cabinet 3 being fixedly supported between the front cover 2 and the rear cabinet 4, it is possible to eliminate the need for the screws used in the conventional example between the front cabinet 3 and the front cover 2 and between the front cabinet 3 and the rear cabinet 4. This helps achieve cost reduction and enhanced working efficiency.

This is the end of the description of the embodiment of the present invention. Obviously, many modifications and variations of the present invention are possible in light of the above teachings. It is therefore to be understood that within the scope of the appended claims, the invention may be practiced other than as specifically described. For example, the edge of the projection 3a may be formed into a shape that allows the projection 3a to fit into the depression 2a more securely at a portion where they make contact with each other, such that the projection 3a is locked by the depression 2a more firmly.

In addition, it is possible to increase joint strength between the front cabinet 3 and the front cover 2 by increasing the number of the projections 3a. Incidentally, a constitution in which a projection is formed all around the upper edge of the side wall 3h of the front cabinet 3 and a depression corresponding to the projection is formed all around the upper edge of the side wall 2h of the front cover 2 falls within the scope of the invention.

Furthermore, a hooked lug and a hole corresponding thereto, which have been described in the "Background of the Invention" section, may be formed in the cabinet of the above-described embodiment.

The assembly structure of a cabinet according to the invention can be applied not only to liquid crystal display devices but also to plasma display televisions and EL televisions. In addition, the present invention finds wide application in cabinets in general that adopt a double-layered structure.

The present invention can be applied to cabinets for thin display devices such as liquid crystal displays, plasma displays, and organic EL displays.

What is claimed is:

1. A display device comprising:
    a front cover having a continuous side wall along the perimeter thereof;
    a front cabinet having a continuous side wall along the perimeter thereof; and
    a rear cabinet having a continuous side wall along the perimeter thereof;
    a display device body being placed inside a storage portion formed by bringing into contact a distal edge of the side wall of the front cabinet and a distal edge of the side wall of the rear cabinet;
    a display window for displaying an image from the display device body being provided in a central portion of each of the front cabinet and the front cover, respectively,
    the front cover being attached on a front face of the front cabinet,
    wherein a projection extending outward from the front cabinet is formed on a distal edge of the side wall of the front cabinet,
    wherein a depression is formed on an inner part of a distal edge of the side wall of the front cover,
    wherein a protrusion extending in a direction in which the side wall of the rear cabinet extends is formed on the distal edge of the side wall thereof,
    wherein, when the front cover, the front cabinet, and the rear cabinet are assembled together, an outer surface of the side wall of the front cabinet makes contact with an inner surface of the side wall of the front cover so that the projection makes contact with or fits into the depression, the protrusion makes contact with an inner surface of the side wall of the front cabinet opposite the outer surface of the side wall of the front cabinet from which the projection extends outward, and the projection is pressed against the depression, by the protrusion and the distal edge of the side wall of the rear cabinet, in a transverse direction, such that the projection is locked in the depression; wherein the front cabinet fits into the front cover with the entire outer surface of the side wall of the front cabinet overlapping the entire inner surface of the side wall of the front cover with no gap in between.

2. The display device of claim 1, wherein the projection has a wedge shape.

3. The display device of claim 1,
wherein rear cabinet connecting bosses are formed on a back face of the front cover and are aligned with front cover connecting bosses formed near the protrusion on a front face of the rear cabinet, and the rear cabinet connecting bosses and the front cover connecting bosses are fixed together by being fastened together with screws.

* * * * *